United States Patent
Shibatani et al.

[11] 3,882,448
[45] May 6, 1975

[54] BRAKE LINING WEAR INDICATOR

[75] Inventors: Jyuichi Shibatani; Sadayoshi Ito, both of Toyota, Japan

[73] Assignee: Toyota Jidosha Kogyo Kabushiki Kaisha, Toyota, Japan

[22] Filed: May 7, 1973

[21] Appl. No.: 357,898

[30] Foreign Application Priority Data
Oct. 14, 1972 Japan.................. 47-10309

[52] U.S. Cl.............................. 340/52 A; 200/61.4
[51] Int. Cl......................................... B60r 25/10
[58] Field of Search......... 340/52 A, 52 B; 200/61.4

[56] References Cited
UNITED STATES PATENTS

| | | | |
|---|---|---|---|
| 2,636,090 | 4/1953 | Branschofsky | 340/52 A |
| 3,297,985 | 1/1967 | Trebonsky et al. | 340/52 A |
| 3,321,045 | 5/1967 | Veilleux | 340/52 A UX |
| 3,553,643 | 1/1971 | Maras | 340/52 A |
| 3,660,815 | 5/1972 | Rees | 340/52 A |
| 3,675,197 | 7/1972 | Bennett | 340/52 A |
| 3,716,831 | 2/1973 | Rikard et al. | 340/52 A |

*Primary Examiner*—Alvin H. Waring
*Attorney, Agent, or Firm*—Stevens, Davis, Miller & Mosher

[57] ABSTRACT

A brake lining wear indicator featured by a simply constructed electronic control circuit including probe means of which a conductive element will be disconnected by frictional engagement with a member to be braked when a brake lining experiences a wear to a point for its replacing, wherein upon the disconnection of the conductive element, alarm means included within the control circuit is activated and the disconnection will be maintained without any mechanical short connection so as to hold the activated condition of the alarm means until the brake lining is replaced.

9 Claims, 15 Drawing Figures

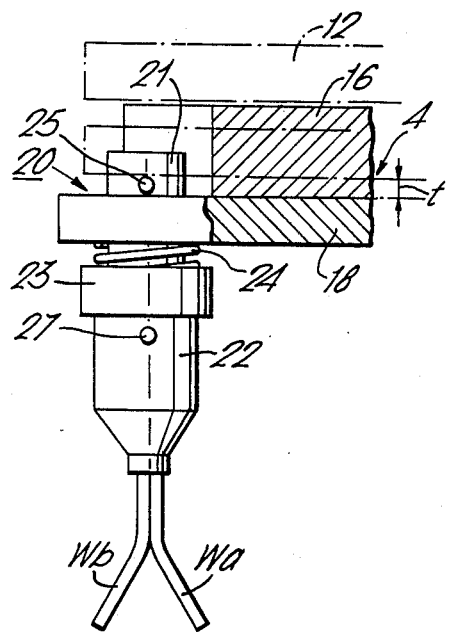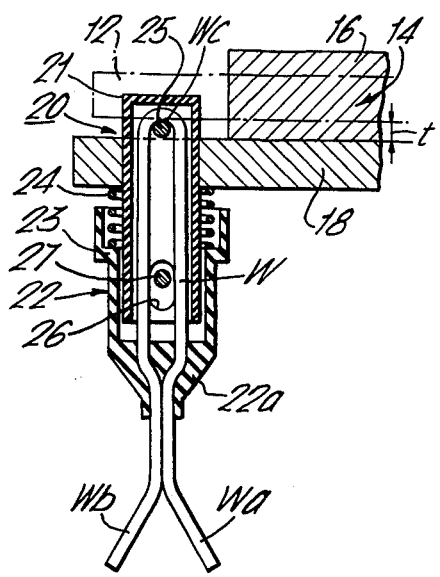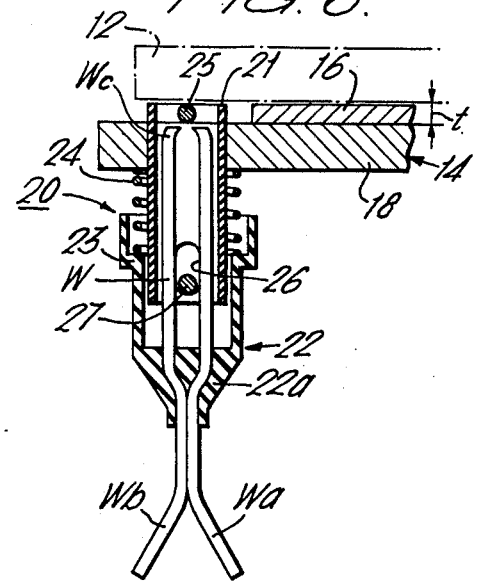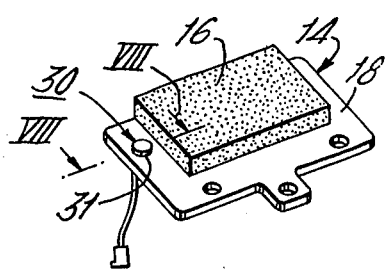

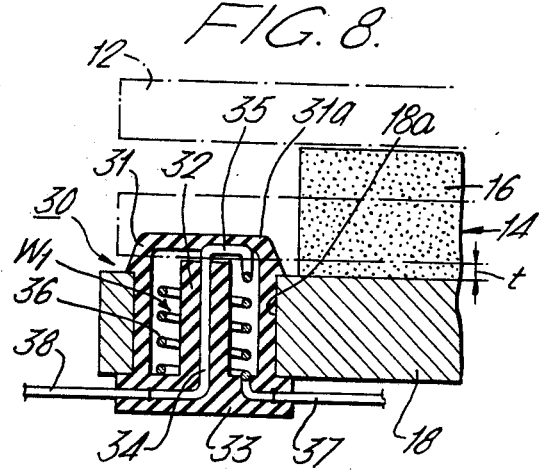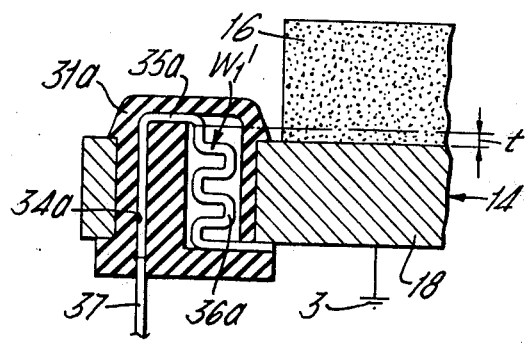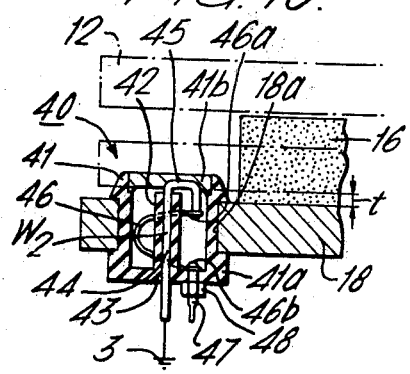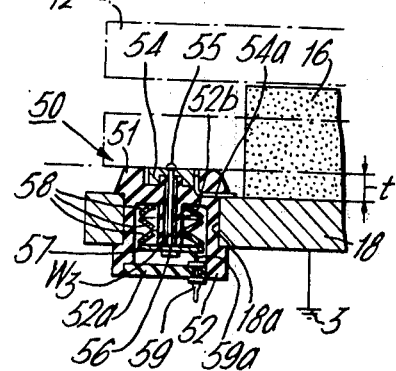

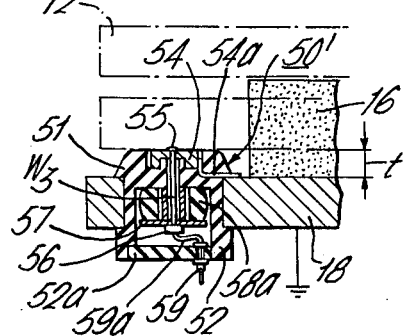
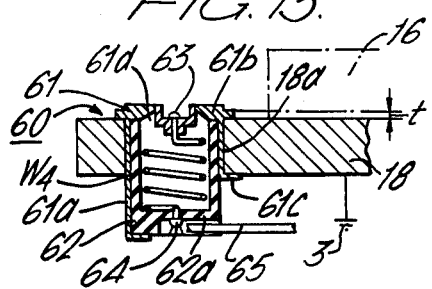
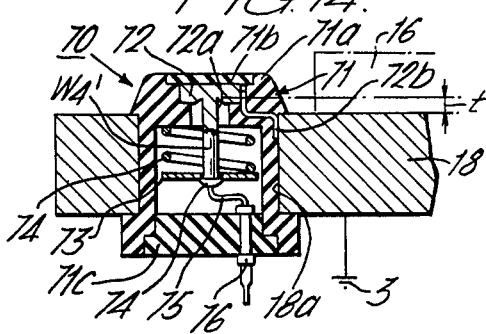
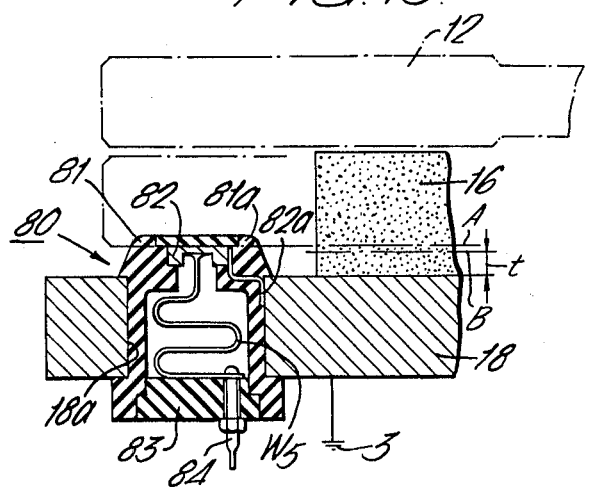

BRAKE LINING WEAR INDICATOR

BACKGROUND OF THE INVENTION

The present invention relates to a friction member wear indicator for issuing an alarm upon defacement of the friction member to its renewal level, and more particularly to a brake lining wear indicator for electrically probing the maximum allowable defacement of the brake lining utilized for a drum or a disc brake of a vehicle.

In conventional brake lining wear indicators, the alarm was issued by contact of an electric terminal inlaid within the lining with the brake drum or the brake disc. Another way was also introduced, wherein a lead wire was inlaid within the brake lining and upon disconnection of the wire by frictional engagement with the brake drum or the brake disc, an electrical relay was operated to activate the alarm means for a certain period of time.

With the above-mentioned conventional types of an indicator, such a memory element as a relay and the like was necessary to maintain the alarming by way of a light bulb and others until the renewal of the worn brake lining. This made the construction more complicated to increase much the production cost.

SUMMARY OF THE INVENTION

The prime object of the present invention is, therefore, to provide a brake lining wear indicator particulary featured by a simply constructed electric control circuit including probe means of which a conductive element will be disconnected by frictional engagement with a brake drum or a brake disc when the brake lining experiences a wear to a point for its replacing, wherein upon the disconnection of the conductive element, alarm means included within the control circuit is activated and the disconnection will be well maintained without any mechanical short connection so that the alarming will be always and constantly maintained independently of operation of the brake system.

Another important object of the present invention is to provide a brake lining wear indicator, having the above-mentioned characteristics, wherein the conductive element of the probe means is assembled within a non-conductive plug mounted on a back plate of the brake lining and is retracted inwardly within the plug upon its disconnection so that any conductive friction dust or the like will not cause any electrical short connection of the disconnected conductive element thereby secured alway is stable alarming operation.

A further important object of the present invention is to provide a brake lining wear indicator, having the above-mentioned characteristics, wherein the probe means for the control circuit can easily be installed on the back plate of the brake lining and the replacement of the probe means can simply be realized.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 2 to 6, inclusive, illustrate a first preferred embodiment of the wear indicator in accordance with the present invention; FIG. 2 showing a partially sectional plan view of a disc brake assembly, FIG. 3 being a partially enlarged front view of FIG. 2, FIG. 4 being a partially sectional plan view of FIG. 3, FIG. 5 illustrating a cross-sectional view taken from V — V line in FIG. 3 and FIG. 6 showing the function of a probe means shown in FIG. 5.

FIGS. 7 to 9, inclusive, illustrate other preferred embodiments of a brake lining wear indicator in accordance with the present invention; FIG. 7 showing a perspective view to show the assembling position of the wear indicator in accordance with the present invention, FIG. 8 illustrating a partially enlarged sectional view taken along VIII — VIII in FIG. 7 and FIG. 9 showing a partially enlarged sectional view of a modification of FIG. 8.

FIGS. 10 to 15, inclusive, illustrate other preferred embodiments of a brake lining wear indicator in accordance with the present invention in the same way as taken in FIG. 8, these figures being partially enlarged sectional views.

DESCRIPTION OF THE PREFERRED EMBODIMENTS

Figure 1:
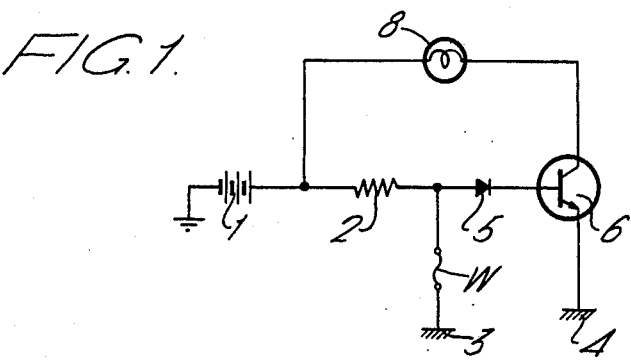
FIG. 1 shows schematically an electric circuit for a brake lining wear indicator in accordance with the present invention.

Referring now to the drawings, particularly in FIG. 1, there is schematically shown a general electrical circuit of the brake lining wear indicator in accordance with the present invention. The circuit includes a warning light bulb 8 and a transistor 6. Base of the transistor 6 is in connection with the vehicle battery or source of voltage 1 through a diode 5 and a resistor 2. Collector of the transistor 6 is connected with the light bulb 8 of which the other terminal is connected to the voltage source 1. Emitter of the transistor 6 extends directly to an electrical ground 4. An electrical conducting element W, which is the substantial component of the present invention, is interposed between and connected to the junction of the diode 5 and the resistor 2 and an electrical ground 3.

In the mentioned circuit, while the conducting element W remains in its normal conducting state, the source of voltage 1 is grounded through the resistor 2 and the conducting element W. Thus, the transistor 6 is switched to a non-conducting state, which causes the light bulb 8 not to glow. When the conducting element W is conditioned to a non-conducting state, the voltage source 1 will be imposed across the transistor 6 through the resistor 2 and the diode 5, switching the transistor 6 to a conductive state which causes the light bulb 8 to glow. The light bulb 8 will glow as well in the case that a lead wire of the conducting element W is broken or disconnected.

Figure 2:
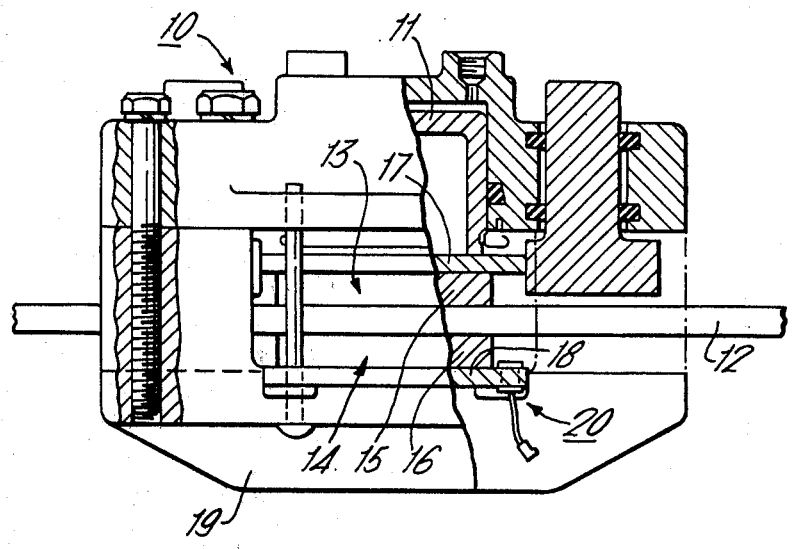
Figure 3:
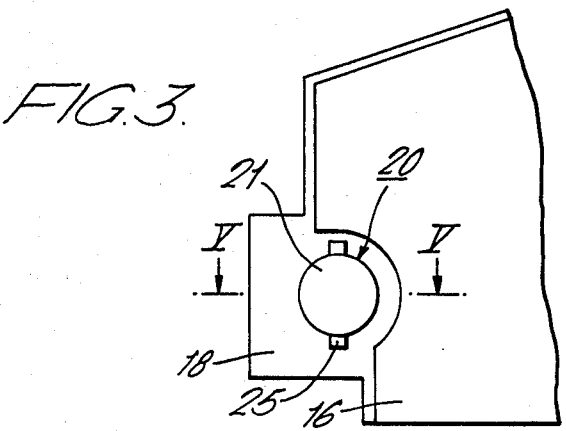

Referring now to FIGS. 2 to 6, inclusive, disclosed is an application of a preferred embodiment of the present invention onto a conventional disc brake of a vehicle. In FIG. 2, a disc brake assembly 10 includes a member to be braked or brake disc 12 and a pair of friction means 13 and 14 to be pressed onto the both friction faces of the disc 12. A piston 11 is provided to actuate the friction means 13 and 14 into engagement with the disc 12, when it is desired to arrest the movement of the vehicle.

The friction means 13 comprises a back plate 17 to be actuated directly by the piston 11 and a brake lining 15 secured on the back plate 17. And the other friction member 14 is comprised of a back plate 18 to be actuated by an anchor block 19 and a brake lining 16 secured on the back plate 18. The linings 15 and 16 are to frictionally engage the friction faces of the disc 12 by way of the operation of the piston 11 to retard the movement of the vehicle. And, as well as seen in FIG. 2, a probe means 20 is mounted on the back plate 18 of the friction means 14.

Reference is now made to FIGS. 3 to 6, inclusive, wherein the probe means 20 comprises a cylindrical plug 21 made of insulating materials and secured on the back plate 18, a stepped cylindrical plug socket 22 axially telescopically engaging the lower portion of the plug 21, the conducting element W made of electrically conductive materials in a loop shape and integrally secured on the base portion 22a of the plug socket 22, and a compression coil spring 24 interposed between the back plate 18 and an interior shoulder portion 23 of the plug socket 22 thereby to bias the plug socket 22 outwardly or downwardly in FIGS. 5 and 6. A stopper pin 25 is removably mounted on the upper portion of the plug 21 to engagingly hold the conducting loop W at the top end thereof. And an elongated hole 26 is drilled through the lower portion of the plug 21 and inserted in this hole 26 is a pin 27 removably mounted on the plug socket 22.

The probe means 20 is assembled in such a way as firstly the spring 24 is placed over the outer circumference of the plug 21 and the plug socket 22 is coupled upwardly with the plug 21, the top portion Wc of the conducting loop W being hooked on the stopper pin 25 against the resilient force of the spring 24. Then, the pin 27 is fixedly mounted on the plug socket 22 through the elongated hole 26 of the plug 21 and the center space of the conducting loop W. In the probe means 20, thus, the conducting loop W is assembled with a predetermined load by means of the spring 24.

Referring back now to FIG. 1, one end Wa of the conducting loop W is connected to the junction of the diode 5 and the resistor 2 by way of a wire (not shown), the other end Wb extending to the electrical ground 3.

The function of the brake lining wear indicator as embodied above is detailed hereinafter in reference with FIGS. 5 and 6. While the lining 16 of the friction member 14 remains in a thickness over the one identified by t representing the point of the wear at which the lining 16 should be replaced, the probe means 20 remains inoperative and the electrical continuity is kept between the voltage source 1 and the electrical ground 3 through the conducting element W. This keeps the transistor 6 in a non-conducting state and the light bulb 8 does not glow. Substantial wear of the lining 16 down to the thickness t exposes the probe means 20 against the disc 12. The flat top of the plug 21 is defaced and sequentially, the top portion Wc of the conducting loop W is worn out and disconnected, as best shown in FIG. 6.

The disconnection of the top portion Wc of the conducting loop W releases the engagement between the conducting loop W and the stopper pin 25. This frees the compression coil spring 24 to bias the plug socket 22 downward in the figure. Then, the disconnected top portion Wc of the conducting loop W is pulled down along the interior wall of the plug 21, being separated by the stopper pin 27. In this instance, the plug socket 22 is held in its downwardly biased position being prevented from falling off from the plug 21 by the engagement of the pin 27 with the lower end of the elongated hole 26 of the plug 21. The pin 27 secures the separated positions of the portion Wc of the conducting loop W against vibrations and oscillations given to the probe means 20. Simultaneously with the disconnection of the top portion Wc, the transistor 6 is switched to a conducting state to glow the light bulb 8, which is a warning to the vehicle operator that the lining 16 is worn out to a point for replacing. This warning by the light bulb 8 will be maintained till the lining 16 is replaced since the disconnected top portion Wc is kept separated within the plug 21.

Disclosed hereinafter are other preferred embodiments of the brake lining wear indicator in accordance with the present invention. In these embodiments, same or similar reference numerals are used for the component parts or portions as in the first preferred embodiment. And no repetition will be made in regard to the same or similar constructions and functions.

Reference is now made to FIGS. 7 to 9, inclusive, disclosed is a second preferred embodiment of the brake lining wear indicator in accordance with the present invention. A distinctive feature of this embodiment is represented by a conducting element $W_1$ made of electrical conducting and resilient materials, thus, giving assembly load thereto.

As best shown in FIGS. 7 and 8, a probe means 30 comprises a plug 31 made of such a defaceable anti-heat synthetic resin as represented by a trademark of "Tephron" and secured on the back plate 18 of the friction member 14, and a conducting element $W_1$ which is made in the shape of a coil spring. The plug 31 is, as best shown in FIG. 8, pressed in and secured within a through hole 18a drilled through the back plate 18 and includes a boss 32 extending upwardly at the center of the bottom portion 33 and a top portion 31a projecting up from the top face of the back plate 18. The conducting element $W_1$ comprises a holding portion 34 confined integrally within the boss 32 of the plug 31, a defaceable portion 35 secured on the interior wall of the top portion 31a of the plug 31, the contact portion 35 being positioned in correspondence with the thickness represented by t so as to be disconnected in response with the defacement of the brake lining 16 down to the point t, and a spiral coil portion 36 which is wound along the boss 32 and given a predetermined self-returning force. The end of the spiral coil portion 36 is connected to a lead wire 37 which extends to the connecting point of the diode 5 and the resistor 2 and the end of the holding portion 34 is connected to the electrical ground 3 through a lead wire 38. (FIG. 1)

The lining 16 will be defaced by subsequent brake applications and the top portion 31a of the plug 31 will have frictional contact with the friction face of the disc 12. The contact portion 35 of the conducting element $W_1$ will be disconnected by the disc 12, when the lining 16 is worn out down to the thickness t where the lining 16 should be replaced. Upon the disconnection of the contact portion 35, the conducting element $W_1$ retracts downward in the figure by its own resilient force to create an electrical discontinuity between the source of voltage 1 and the electrical ground 3. Consequentially the light bulb 8 glows through the same process as described in the first preferred embodiment.

Disclosed in FIG. 9 is a modification of the second preferred embodiment. In this modification, the conducting member $W_1$ of the second preferred embodiment is replaced with a conducting member $W_1'$ which comprises a leaf type resilient member. The conducting member $W_1'$ includes a holding portion 34a integrally secured within the body portion of a plug 31a, a contact portion 35a secured on the interior of the top portion of the plug 31a in such a position as to be disconnected when the lining 16 is defaced down to the thickness identified by $t$, and a leaf type spring portion 36a confined within the plug 31a with a given self-returning force in a predetermined value. The portion 34a is connected to the lead wire 37 extending to the connecting point of the diode 5 and the resistor 2 and the leaf type spring portion 36a is connected to the electrical ground 3 through the back plate 18.

Disclosed in FIG. 10 is a third preferred embodiment of the brake lining wear indicator in accordance with the present invention; a distinctive feature of this third preferred embodiment is represented by application of a leaf spring 46 to give an assembling load to a conducting member $W_2$.

A probe means 40 adapted in this embodiment comprises a plug 41 made of defaceable electrical insulating materials such as an anti-synthetic resin known by a trade mark of Tephron and secured on the back plate 18, the conducting member $W_2$ made of copper wire and contained within the plug 41, and the leaf spring 46 for giving the conducting member $W_2$ the assembling load. The plug 41 includes a body portion 41a pressed in and secured on the through hole 18a provided on the back plate 18 and a cover portion 41b secured integrally on the top of the body portion 41a projecting upward from the upper surface of the back plate 18. At the center of the bottom portion 43 of the plug 41, a boss 42 extends upward. A holding portion 44 of the conducting member $W_2$ is integrally secured within the boss 42 of the plug 41. The conducting member $W_2$ also includes a contact portion 45 secured on the interior of the cover portion 41b in such a position as to be disconnected when the lining 16 reaches the thickness $t$. The leaf spring 46 is assembled in an approximate U-shaped form to be outwardly self-biased with a predetermined resilient force within the plug 41. One end 46a of the leaf spring 46 is secured on an internal end of the contact portion 45 of the conductive member $W_2$ by calking and the other end 46b of the leaf spring 46 is fixed on a terminal 47 secured on the bottom portion 43 of the plug 41 by way of a nut 48. The terminal 47 is in connection with the junction of the diode 5 and the resistor 2 by a lead wire (not shown) and the external end of the conducting member $W_2$ is in connection with the electrical ground 3 (FIG. 1).

When substantial wear is experienced by the lining 16, the disc 12 will have frictional contact with the cover portion 41b of the plug 41. The disc 12 will disconnect the contact portion 45 of the conducting member $W_2$ when the lining 16 is defaced down to the thickness $t$ which shows that the lining 16 should be replaced. The resilient force of the leaf spring 46 makes a cut-off piece from the contact portion 45 fall inside the plug 41 to cause electrical discontinuity between the source of voltage 1 and the electrical ground 3.

FIGS. 11 and 12 illustrate a fourth preferred embodiment of the brake lining wear indicator in accordance with the present invention, wherein a distinctive feature is represented by a conducting member $W_3$ removably inserted into a plug 51 which is secured on the back plate 18. One end of the conducting member $W_3$ is in a firm connection with an electrode 54 provided at the top portion of the plug 51 and the other end of the conducting member $W_3$ is given a predetermined biasing force.

As well shown in FIG. 11, a probe means 50 adapted in this embodiment includes the plug 51 made of such defaceable electrically insulating materials as an anti-heat synthetic resin represented by the trademark of "Tephron" and secured on the back plate 18, the conducting member $W_3$ made of copper or iron wire and confined within the plug 51, and three annular dish springs 58 to give the conducting element $W_3$ the predetermined assembling load. A body member 52 of the plug 51 is pressed in and secured on the through hole 18a drilled through the back plate 18. The electrode 54 is made of copper or iron and secured on the top portion of the body member 52, the top portion projecting over the front surface of the back plate 18. A bottom cover 52a is secured on the lower end of the plug body 52. The conducting member $W_3$ is transferably inserted within a holding portion 52b integrally jutting from the body member 52 inside the plug 51. The top end of the conducting member $W_3$ is fixed on the electrode 54 disconnectably by a calking 55 and the lower end thereof is provided with an annular stopper plate 57 supported by stopper 56. The three dish springs 58 are interposed between the upper wall of the body member 52 and the plate 57 to bias the conducting member $W_3$ downwardly in the figure.

The electrode 54 is connected to the electrical ground 3 by way of a terminal plate 54a and the back plate 18, while the internal end of the conducting member $W_3$ is in connection to the junction of the diode 5 and the resistor 2 by a lead wire (not shown) through the annular plate 57, a terminal 59 secured on the bottom cover 52a and a lead wire 59a connecting the plate 57 and the terminal 59.

Defacement of the lining 16 causes the disc 12 to have frictional contact with the calker 55 which connects the conducting member $W_3$ and the electrode 54. When the lining 16 is worn down to the thickness $t$, the conducting member $W_3$ is disconnected from the electrode 54. Then, the conducting member $W_3$ falls down inside the plug body 52 by the resilient force of the dish springs 58 to maintain the disconnection between the electrode 54 and the conducting member $W_3$.

Although the three dish springs 58 are adapted as means for biasing the conducting member $W_3$ downward inside the plug body 52 in the explained embodiment, the dish springs 58 can well be replaced with such a resilient member 58a as synthetic rubber and the like as shown in FIG. 12.

A fifth preferred embodiment is referred to FIG. 13. In this particular embodiment, a distinctive feature can be explained by a disconnectable electrode provided on the top portion of a plug made of such defaceable electrically insulating material as anit-heat synthetic resin hereinabove described, and a conducting member $W_4$ given with a predetermined assembling load and connected with the electrode.

A probe means 60 in this fifth embodiment comprises an electrode 61 made of defaceable conductive materials such as aluminum, zinc and the like and secured on the back plate 18, a plug 62 made of electrical insulating materials and pressed in and secured within a cylindrical bore 61a of the electrode 61, and the conducting member $W_4$ which is a coil spring confined within the cylindrical interior of the plug 62. The electrode 61 comprises the cylindrical body portion 61a pressed into the through hole 18a of the back plate 18 and a flange portion 61c which is secured on the back face of the back plate 18. The electrode 61 further includes a portion 61b to be disconnected, which projects up over the front face of the back plate 18, the portion 61b being provided with an annular notch 61d at a height corresponding to the thickness t which indicates that the lining 16 should be replaced. Within the plug 62, the conducting member $W_4$ is secured on the electrode 61 at its top end by calker 63 and at the lower end thereof on the bottom portion 62a of the plug 62 by a calker 64, thereby to be given a pulling resilient force in a predetermined value. The calker 63 is connected to the electrical ground 3 through the electrode 61 and the back plate 18, while the calker 64 is connected to the junction of the resistor 2 and the diode 5 through a lead wire 65.

Defacement of the brake lining 16 causes frictional contact of the disc 12 with the portion 61b to be disconnected. When the lining 16 is worn down to the thickness t, the pulling resilient force of the conducting member $W_4$ is effected to disconnect the portion 61b. Consequentially, the conductive member $W_4$ retracts within the plug 62 by its self-returning force thereby to maintain the disconnection between the electrode 61 and the conducting member $W_4$.

FIG. 14 is to illustrate a modification of the fifth preferred embodiment shown in FIG. 13. Adapted in this modification is a plug 71 made of electrical insulating materials and pressed into the through hole 18a of the back plate 18. The plug 71 includes a top portion 71a projecting over the front surface of the back plate 18. An electrode 72 is mounted in the top portion 71a and a cover member 71b is fixed on the top portion 71a over the mounted electrode 72. A bottom cover 71c is secured on the bottom of the plug 71.

A conducting member $W_4'$ integral with the electrode 72 and extends downward inside the plug 71. An annular plate 73 is fixed on the lower end of the conducting member $W_4'$ by a caulker 74 and an annular notch 72a is provided on the upper end of the conducting member $W_4'$ so that the conducting member $W_4'$ may be disconnected at the notch 72a when the lining 16 is worn down to the thickness t indicating the necessity of lining replacing. The conducting member $W_4'$ is biased downwardly in the figure by a compression coil spring 74 interposed between the inner shoulder portion of the plug 71 and the annular plate 73. One end of the member $W_4'$ is in connection with the electrical ground 3 through a terminal plate 72b secured on a portion of the electrode 72 and the back plate 18, while the other end is in connection with the junction of the resistor 2 and the diode 5 through a terminal 76 mounted on the bottom cover 71c, the calker 74 and a lead wire 75. Function in this modification is almost same as that of the fifth preferred embodiment and no repetition is made here.

FIG. 15 illustrates a sixth preferred embodiment of the brake lining wear indicator in accordance with the present invention; this sixth preferred embodiment may be featured by adaptation of an electrode which is disconnected by melting from a conductive member $W_5$ which is given an assembling load in a predetermined value.

A probe means 80 in this embodiment comprises a plug 81 made of the anti-heat synthetic resin described hereinabove and pressed in and secured on the through hole 18a provided on the back plate 18 and an electrode 82 secured on the top portion 81a of the plug 81. This electrode 82 is made of such metal materials as copper alloy and the like which has a high melting point. The probe means 80 includes the conducting member $W_5$ confined inside the plug 81. The conductive member $W_5$ is formed in the shape of a leaf spring which is bent at plural points and one end of the conducting member $W_5$ is meltably secured on the interior side of the electrode 82 with such metal materials as leas alloy which has a low melting point. The other end of the conducting member $W_5$ is given a certain pulling force and secured on the interior end of a terminal 84 mounted on a bottom cover 83 of the plug 81.

One end of the conducting member $W_5$ is in connection with the electrical ground 3 through the electrode 82, the terminal 82a and the back plate 18, the other end being connected to the junction of the resistor 2 and the diode 5 through the terminal 84.

When the lining 16 is worn out down to the thickness t, the disc 12 engages with the face A of the electrode 82 to create a high frictional heat on the electrode 82 up to a certain high temperature, for instance, approximately 250°C. By this frictional heat, the connected portion of the electrode 82 and the conducting member $W_5$ is melted and the two component parts are separated. Then, the conducting member $W_5$ retracts within the plug 81 by its own resilient force thereby maintained is electrical discontinuity between the electrode 82 and the conducting member $W_5$.

In case that the frictional contact of the disc 12 with the fact A of the electrode 82 should not create a high frictional heat, for instance when very light braking operation is only made, the disc 12 will finally reach the face B of the electrode 82 to mechanically or frictionally effect the electrical discontinuity between the electrode 82 and the conducting member $W_5$. It would be observed in this particular embodiment that when heavy braking application is always made, defacement of the lining 16 can be sensed out at an earlier stage and on the contrary when the light braking application is only made, the brake lining 16 can be used fully down to the extreme limit where the lining 16 should be replaced.

Having now fully set forth both structure and function of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a brake lining wear indicator comprising a member to be braked, a friction member having a brake lining for engagement with said member to be braked, probe means mounted on said friction member for engagement with said member to be braked after a predetermined amount of lining wear, alarm means, and electric control means operatively connected with said probe means for activating said alarm means, the improvement wherein said electric control means comprises a transistor of which the base is connected to an electric source and grounded through said probe means, the collector is connected to the electric source through said alarm means and the emitter is grounded, and said probe means comprises a non-conductive plug mounted on a back plate of said friction member and a spring loaded conductive element assembled within said plug, said conductive element including a portion to be disconnected by way of the frictional engagement with said member to be braked, said portion of the disconnected projecting within said plug from the front face of said back plate correspondingly to the predetermined amount of lining wear and remaining disconnected after said frictional engagement with said member to be braked, and said conductive element being disconnectably secured at one end thereof on the portion of said plug projecting from the front face of said back plate and previously biased at the other end thereof inwardly within said plug by a compressed resilient means interposed between a stopper for receiving the other end of said conductive element and the interior wall of said plug thereby to pull said conductive element inwardly upon disconnection of said conductive element.

2. In a brake lining wear indicator comprising a member to be braked, a friction member having a brake lining for engagement with said member to be braked, probe means mounted on said friction member for engagement with said member to be braked after a predetermined amount of lining wear, alarm means, and electrode control means operatively connected with said probe means for activating said alarm means, the improvement wherein said electric control means comprises a transistor of which the base is connected to an electric source and grounded through said probe means, the collector is connected to the electric source through said alarm means and the emitter is grounded, and said probe means comprises a non-conductive plug mounted on a back plate of said friction member and a spring loaded conductive element assembled within said plug, said conductive element including a portion to be disconnected by way of the frictional engagement with said member to be braked, said portion to be disconnected projecting within said plug from the front face of said back plate correspondingly to the predetermined amount of lining wear and remaining disconnected after said frictional engagement with said member to be braked, and said conductive element being disconnectably secured at one end thereof on the portion of said plug projecting from the front face of said back plate and previously biased at the other end thereof inwardly within said plug by a leaf spring resilient means caulked at its both ends respectively on the other end of said conductive element and the bottom portion of said plug to be outwardly self-biased thereby to pull said conductive element inwardly upon disconnection of said conductive element.

3. In a brake lining wear indicator comprising a member to be braked, a friction member having a brake lining for engagement with said member to be braked, probe means mounted on said friction member for engagement with said member to be braked after a predetermined amount of lining wear, alarm means, and electric control means operatively connected with said probe means for activating said alarm means, the improvement wherein said electric control means comprises a transistor of which the base is connected to an electric source and grounded through said probe means, the collector is connected to the electric source through said alarm means and the emitter is grounded, and said probe means comprises a non-conductive plug mounted on a back plate of said friction member and a spring loaded conductive element assembled within said plug, said conductive element including a portion to be disconnected by way of the frictional engagement with said member to be braked, said portion to be disconnected projecting within said plug from the front face of said back plate correspondingly to the predetermined amount of lining wear and remaining disconnected after said frictional engagement with said member to be braked, and said plug including a socket telescopically coupled therewith and said conductive element is formed in a loop shape, the top end of which is secured on the portion of said plug projecting from the front face of said back plate and the tail end of which is integrally mounted on the base portion of said socket, said conductive element being biased by a compression spring interposed between the back face of said back plate and a portion of said socket.

4. In a brake lining wear indicator comprising a member to be braked, a friction member having a brake lining for engagement with said member to be braked, probe means mounted on said friction member for engagement with said member to be braked after a predetermined amount of lining wear, alarm means, and electric control means operatively connected with said probe means for activating said alarm means, the improvement wherein said electric control means comprises a transistor of which the base is connected to an electric source and grounded through said probe means, the collector is connected to the electric source through said alarm means and the emitter is grounded, and said probe means comprises a non-conductive plug mounted on a back plate of said friction member and a spring loaded conductive element assembled within said plug, said conductive element including a portion to be disconnected by way of the frictional engagement with said member to be braked, said portion to be disconnected projecting within said plug from the front face of said back plate correspondingly to the predetermined amount of lining wear and remaining disconnected after said frictional engagement with said member to be braked, said conductive element being formed by a spring element which is secured at its both ends respectively on the bottom portion of said plug and the portion of said plug projecting from the front face of said back plate thereby to be inwardly self-biased away from said member to be braked, and said plug including a boss extending from the center of said bottom portion thereof toward said projecting portion thereof and said conductive element comprising a holding portion integrally confined within said boss, a defaceable portion extending from said holding portion and secured on said projecting portion, and a spiral coil portion extending from said defaceable portion and wound along said boss, the end of said spiral portion being integrally confined within said bottom portion of said plug thereby self-biasing said conductive element.

5. In a brake lining wear indicator comprising a member to be braked, a friction member having a brake lining for engagement with said member to be braked, probe means mounted on said friction member for engagement with said member to be braked after a predetermined amount of lining wear, alarm means, and electric control means operatively connected with said probe means for activating said alarm means, the improvement wherein said electric control means comprises a transistor of which the base is connected to an electric source and grounded through said probe means, the collector is connected to the electric source through said alarm means and the emitter is grounded, and said probe means comprises a non-conductive plug mounted on a back plate of said friction member and a spring loaded conductive element assembled within said plug, said conductive element including a portion to be disconnected by way of the frictional engagement with said member to be braked, said portion to be disconnected projecting within said plug from the front face of said back plate correspondingly to the predetermined amount of lining wear and remaining disconnected after said frictional engagement with said member to be braked, said conductive element being formed by a spring element which is secured at its both ends respectively on the bottom portion of said plug and the portion of said plug projecting from the front face of said back plate thereby to be inwardly self-biased away from said member to be braked, and said conductive element comprising a holding portion integrally confined within a thickened side wall of said plug, a defaceable portion extending from said holding portion and secured on said projecting portion of said plug, and a folded leaf spring portion extending from said defaceable portion, the end of said folded leaf spring portion being firmly secured on said bottom portion of said plug thereby self-biasing said conductive element.

6. A brake lining wear indicator as claimed in claim 1, wherein said compressed resilient means is made of synthetic rubber.

7. A brake lining wear indicator as claimed in claim 1, wherein said compressed resilient means is composed of at least one dish spring.

8. A brake lining wear indicator as claimed in claim 1, wherein said compressed resilient means is a compression coil spring.

9. A brake lining wear indicator as claimed in claim 3, wherein said loop-shape conductive element engages at the top end thereof with a holding pin provided on the projecting portion of said plug and said plug is telescopically coupled with said socket by way of a pin transversing said loop-shape conductive element and held on said socket.

* * * * *